US012792904B2

(12) United States Patent
Hsu et al.

(10) Patent No.: US 12,792,904 B2
(45) Date of Patent: Nov. 10, 2026

(54) METHODS AND DEVICES FOR NEURAL NETWORK QUANTIZATION USING TEMPORAL PROFILING

(71) Applicant: BEIJING TRANSTREAMS TECHNOLOGY CO. LTD., Beijing (CN)

(72) Inventors: Ming Kai Hsu, Fremont, CA (US); Chao Yang, Beijing (CN); Yue Ma, Beijing (CN); Sikai Wang, Beijing (CN); Sitong Feng, Sunnyvale, CA (US); Wenhui Cao, Beijing (CN); Danqing Li, Beijing (CN); Hui Zhong, Beijing (CN); Lingzhi Liu, San Jose, CA (US)

(73) Assignee: BEIJING TRANSTREAMS TECHNOLOGY CO. LTD., Beijing (CN)

( * ) Notice: Subject to any disclaimer, the term of this patent is extended or adjusted under 35 U.S.C. 154(b) by 945 days.

(21) Appl. No.: 17/476,454

(22) Filed: Sep. 15, 2021

(65) Prior Publication Data

US 2023/0084000 A1 Mar. 16, 2023

(51) Int. Cl.

| | |
|---|---|
| ***G06N 3/08*** | (2023.01) |
| ***G06F 7/523*** | (2006.01) |
| ***G06F 17/18*** | (2006.01) |

(52) U.S. Cl.

CPC ............... *G06N 3/08* (2013.01); *G06F 7/523* (2013.01); *G06F 17/18* (2013.01)

(58) Field of Classification Search

CPC .......... G06N 3/08; G06N 3/0895; G06N 3/09; G06N 3/091; G06N 3/092; G06N 3/094; G06N 3/096; G06N 3/098; G06N 3/0985; G06F 7/523; G06F 17/18

See application file for complete search history.

(56) References Cited

U.S. PATENT DOCUMENTS

| | | | | |
|---|---|---|---|---|
| 2018/0285736 | A1* | 10/2018 | Baum | G06N 3/063 |
| 2019/0042935 | A1* | 2/2019 | Deisher | G06N 3/044 |
| 2020/0097823 | A1* | 3/2020 | Chen | G06N 3/082 |
| 2020/0272162 | A1* | 8/2020 | Hasselgren | G05D 1/0231 |
| 2021/0174172 | A1* | 6/2021 | Qadeer | G06F 17/18 |
| 2021/0406266 | A1* | 12/2021 | Chan | G06N 3/044 |
| 2022/0036155 | A1* | 2/2022 | Guevara | G06N 3/045 |
| 2022/0044096 | A1* | 2/2022 | Asad | G06N 3/044 |

(Continued)

OTHER PUBLICATIONS

He et al., "Effective Quantization Methods for Recurrent Neural Networks," arXiv:1611.10176v1 [cs.LG] Nov. 30, 2016 (Year: 2016).*

(Continued)

*Primary Examiner* — Miranda M Huang
*Assistant Examiner* — Yao David Huang
(74) *Attorney, Agent, or Firm* — Arch & Lake LLP; Hao Tao; Shen Wang

(57) ABSTRACT

Methods and apparatuses are provided for temporal profiling for neural network quantization. The method includes: obtaining a neural network that comprises anode connected to different paths at different time periods; obtaining node outputs for the node at the different time periods; determining statistic properties of the node outputs at the different time periods; and determining activation ranges of the node outputs based on the statistic properties.

20 Claims, 4 Drawing Sheets

(56) References Cited

U.S. PATENT DOCUMENTS

| | | | | |
|---|---|---|---|---|
| 2022/0044109 | A1* | 2/2022 | Donnelly | G06N 3/04 |
| 2022/0044114 | A1* | 2/2022 | Sriram | G06N 3/045 |
| 2022/0076104 | A1* | 3/2022 | Huang | G06N 3/045 |
| 2022/0215239 | A1* | 7/2022 | Tran | G11C 11/54 |

OTHER PUBLICATIONS

Ullah et al., "Action Recognition in Video Sequences using Deep Bi-Directional LSTM With CNN Features," in IEEE Access, vol. 6, pp. 1155-1166, 2018 (Year: 2018).*

Li et al., "On the Quantization of Recurrent Neural Networks," arXiv:2101.05453v1 [cs.LG] Jan. 14, 2021 (Year: 2021).*

Ardakani et al., "Learning Recurrent Binary/Ternary Weights," arXiv:1809.11086v2 [cs.LG] Jan. 24, 2019 (Year: 2019).*

Cooijmans et al., "Recurrent Batch Normalization," arXiv:1603.09025v5 [cs.LG] Feb. 28, 2017 (Year: 2017).*

Karpathy et al., Visualizing and Understanding Recurrent Networks, arXiv:1506.02078v2 [cs.LG] Nov. 17, 2015 (Year: 2015).*

Strobelt et al., "LSTMVis: A Tool for Visual Analysis of Hidden State Dynamics in Recurrent Neural Networks," arXiv:1606.07461v2 [cs.CL] Oct. 30, 2017 (Year: 2017).*

Silfa et al., "Boosting LSTM Performance Through Dynamic Precision Selection," arXiv:1911.04244v1 [eess.SP] Nov. 7, 2019 (Year: 2019).*

Mittal et al., "A survey On hardware accelerators and optimization techniques for RNNs," Journal of Systems Architecture 112 (2021) 101839 (Year: 2021).*

* cited by examiner

METHODS AND DEVICES FOR NEURAL NETWORK QUANTIZATION USING TEMPORAL PROFILING

FIELD

The present application generally relates to neural network quantization, and in particular but not limited to, methods and apparatuses for temporal profiling for neural network quantization.

BACKGROUND

To reduce the computation cost and latency of deep learning neural networks in inference, quantization is an emerging technique that is widely adopted in deep learning neural network deployment. In quantization, how to profile layer activation accurately is crucial since layer activation range is used to calculate the quantization scale.

SUMMARY

In general, this disclosure describes examples of techniques relating to temporal profiling for neural network quantization.

According to a first aspect of the present disclosure, a method of neural network quantization is provided. The method includes: obtaining a neural network that comprises a node connected to different paths at different time periods; obtaining node outputs for the node at the different time periods; determining statistic properties of the node outputs at the different time periods; and determining activation ranges of the node outputs based on the statistic properties.

According to a second aspect of the present disclosure, an apparatus is provided for neural network quantization, including: one or more processors; and a memory configured to store instructions executable by the one or more processors; wherein the one or more processors, upon execution of the instructions, are configured to: obtain a neural network that comprises a node connected to different paths at different time periods; obtain node outputs for the node at the different time periods; determine statistic properties of the node outputs at the different time periods; and determine activation ranges of the node outputs based on the statistic properties.

According to a third aspect of the present disclosure, a non-transitory computer readable storage medium is provided, including instructions stored therein, where, upon execution of the instructions by one or more processors, the instructions cause the one or more processors to perform acts including: obtaining a neural network that comprises a node connected to different paths at different time periods; obtaining node outputs for the node at the different time periods; determining statistic properties of the node outputs at the different time periods; and determining activation ranges of the node outputs based on the statistic properties.

It is to be understood that both the foregoing general description and the following detailed description are exemplary and explanatory only and are not restrictive of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
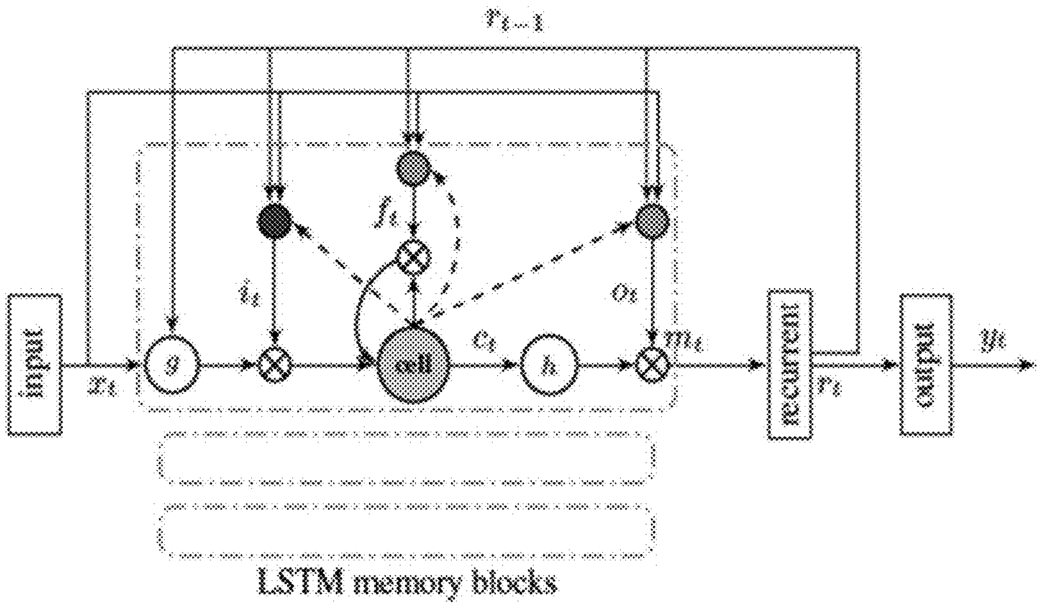
FIG. 1 is a schematic diagram illustrating an exemplary classic LSTM (long short-term memory) in accordance with one or more examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In conventional profiling schemes used in Convolution Neural Networks (CNN), the values of every pixel of the outputs and inputs in each layer are recorded. Then, these values are profiled when running on a data set, and such data set is called a calibration set. The profiling schemes are collecting layer activation spatially, along batching, channel, height and width instead of temporal domain. The current output is determined by the current input only.

In Recurrent Neural Networks (RNN), data flow is different from CNN. In RNN, there are backward or bi-directional loops. It implies that the current output status is determined by not only the current input but also past and/or future inputs. The spatial profiling is insufficient and inaccurate to capture proper temporal layer activations for quantization. In the end, quantization results in RNN are worse than expected.

There are two major issues in the current conventional spatial profiling schemes. The first issue is that it only profiles spatial information, such as input and output of each pixel without temporal information. The second issue is that it does not include forward, backward and bi-directional information.

The present disclosure relates a new systematic approach to solve the challenges of how to profile layer activations in Recurrent Neural Networks (RNN) such as Long Short-Term Memory (LSTM), Gated Recurrent Unit (GRU), etc., efficiently for forward, backward and bi-directional temporal loops. This approach may profile layer activations in RNN efficiently for forward, backward and bi-directional loops with temporal information.

The RNNs are unique as they allow operation over a sequence of vectors over time. A very basic RNN model includes layers where the outputs from the hidden layers are used as inputs with the inputs of hidden layers. A loop allows information to be passed from one step of the network to the next. A RNN can be thought of as multiple copies of the same network, each network passing a message to a successor and/or a predecessor.

The approach in this disclosure is to capture not only spatial information of the layer activations, but also to capture the temporal information and architectural information, forward, backward and bi-directional information in profiling.

FIG. 1 is a schematic diagram illustrating an exemplary classic LSTM (long short-term memory) in accordance with one or more examples of the present disclosure. More specifically, FIG. 1 illustrates a LSTM with a recurrent project layer (LSTMP).

In this LSTMP as illustrated in FIG. 1, corresponding calculations are performed according to the following formulas:

$$i_t=\sigma(W_{i_{xr}}[r_{t-1},x_t]+b_i+W_{i_c}\cdot c_{t-1})$$

$$f_t=\sigma(W_{f_{xr}}[r_{t-1},x_t]+b_f+W_{f_c}\cdot c_{t-1})$$

$$o_t=\sigma(W_{o_{xr}}[r_{t-1},x_t]+b_o+W_{o_c}\cdot c_t)$$

$$g_t=\tanh(W_{g_{xr}}[r_{t-1},x_t]+b_g)$$

$$c_t=f_t\cdot c_{t-1}+i_t\cdot g_t$$

$$m_t=o_t\cdot \text{tahn}(c_t)$$

$$y_t=r_t=\begin{bmatrix} r_t' \\ p_t \end{bmatrix}=[W_{rp}]m_t$$

$$r_{t-1}=r_t'$$

In the above formula, $x_t$ is the input vector to the neural network, $i_t$ is the input gate activation vector, $f_t$ is the forget gate activation vector, $c_t$ is the cell state activation vector, W represents weight matrices, b represents bias vectors, and $o_t$ is the output gate activation vector. $g_t$, $m_t$, $y_t$, and $r_t$ represent different paths in this neural network layer. This is only one example of the paths and structures of a RNN layer, and how the paths are defined or structured in a layer of a neural network is not limited in this disclosure.

In the conventional profiling scheme, Ct and Ct−1 cannot be differentiated, where C denotes node C, t and t−1 denote different paths at different time periods. The same issue also presents in Rt and Rt−1. With this regard, the profiled layer activations in node C and node R are mixed with different paths at different time periods. In the end, it causes significant quantization loss due to incorrect profiled layer activations in RNN.

On the other hand, with the temporal profiling scheme for RNN according to one or more examples of the present disclosure, node C and node R with different paths at different time periods are profiled accordingly without being messed up. In the end, quantization loss may be minimized.

Figure 2:
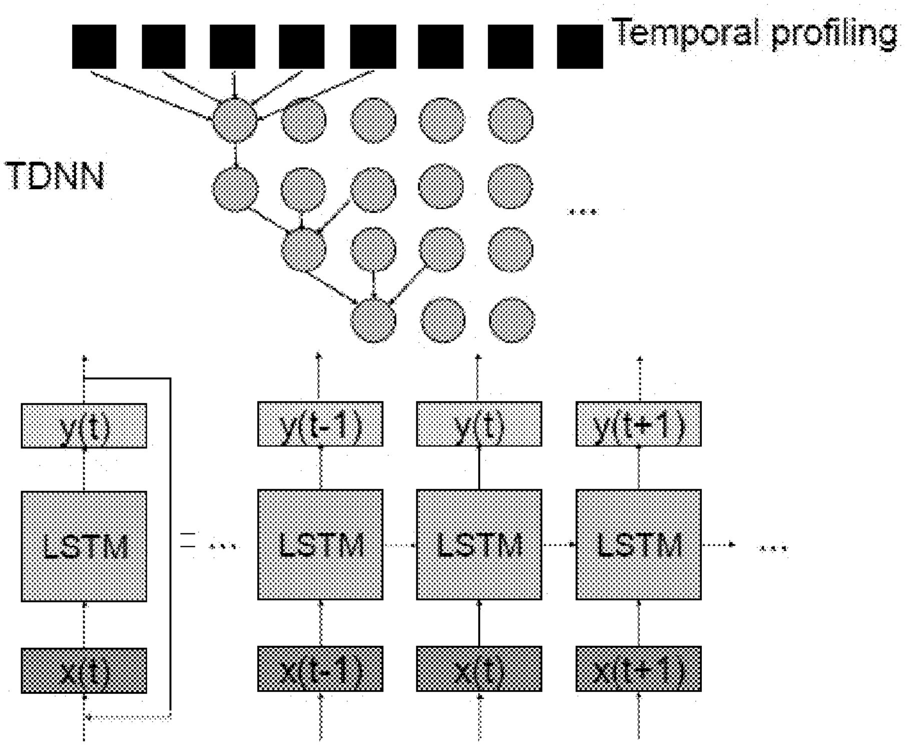
FIG. 2 is a schematic diagram illustrating an exemplary unrolled loop of a LSTM layer in accordance with one or more examples of the present disclosure.

FIG. 2 is a schematic diagram showing what happens if the loop of the LSTMP is unrolled with temporal profiling in a time delay neural network (TDNN) according to one or more examples of the present disclosure. At different time stamps, output through the same paths in this layer may be different, and statistic properties of such different outputs are recorded for temporal profiling.

For example, at time stamp t, x(t) represents the input to the LSTM layer, and y(t) denotes the output of this layer at this time stamp t. t−1 and t+1 respectively represent another two different time periods. Inputs to this layer of the neural network at these two different time periods, x(t−1) and x(t+1), are separately records. So do the outputs of this layer, y(t) and y(t+1), which are recorded correspondingly for temporal profiling.

Figure 3:
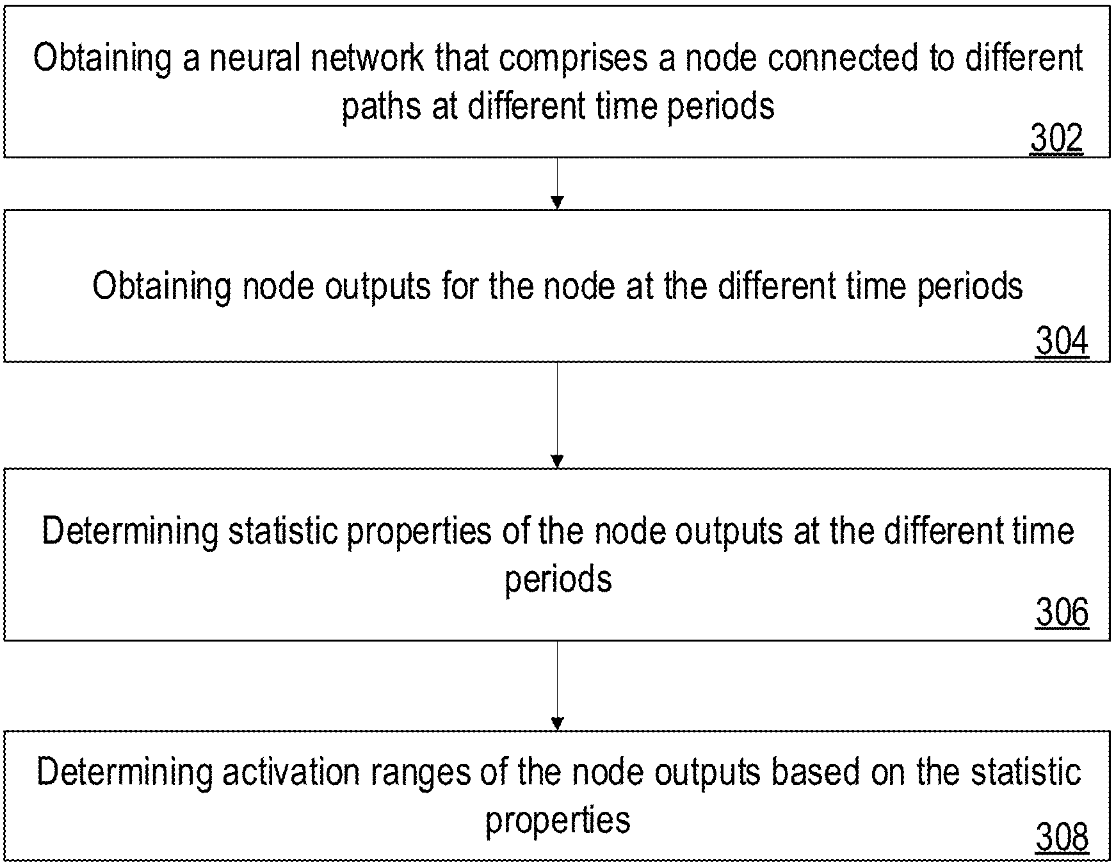
FIG. 3 is a flow diagram illustrating exemplary neural network quantization process in accordance with some examples of the present disclosure.

FIG. 3 is a flow diagram illustrating exemplary neural network quantization process in accordance with some examples of the present disclosure.

In Step 302, a neural network that comprises a node connected to different paths at different time periods is obtained. Such neural network may comprise multiple layers, such as input layers that take raw input from the domain, hidden layers that take input from another layer and pass output to another layer, and output layers that make a prediction.

There are many different types of activation functions used in neural networks. All hidden layers may use the same activation function. The output layer may use a different activation function from the hidden layers and is dependent upon the type of prediction required by the model. In one or more examples, the different time periods may be t and t-n, where n is a nonzero integer.

In Step 304, node outputs for the node are obtained at different time periods. Multiple node outputs may be obtained for one node in a layer of a RNN, and such node outputs are obtained and recorded based on different time periods, such as t, t−1, t−2, t−3, etc.

In Step 306, statistic properties of the node outputs are determined at different time periods. Various statistic properties of the node outputs may be calculated and recorded, and such statistic properties may include one or a combination of following: a maximum value, a minimum value, a mean estimate, a histogram, a probability density function, a variance estimate, an entropy, a cross entropy, a Kullback-Leiber Divergence, etc.

In Step 308, activation ranges of the node outputs are determined based on the statistic properties determined in Step 306. Such that, how the weighted sum of the input at this node can be transformed into an output from the node may be determined in this layer of the neural network.

Figure 4:
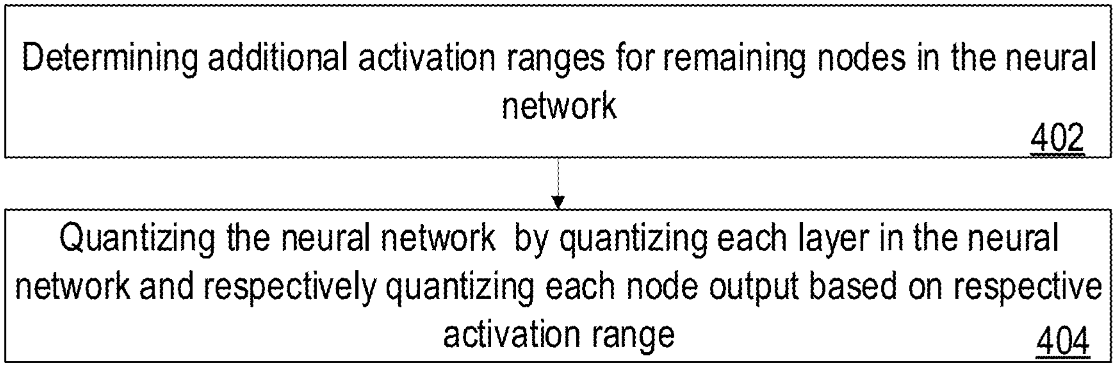
FIG. 4 is a flow diagram illustrating additional steps in the exemplary neural network quantization process according to some examples of the present disclosure.

FIG. 4 shows a flow diagram illustrating additional steps in the exemplary neural network quantization process according to some examples of the present disclosure.

Based on Step 402, in a layer of the neural network with multiple nodes, additional activation ranges for remaining nodes are determined.

In Step 404, the neural network is quantified by respectively quantizing each layer and each node output based on their respective activation ranges.

Figure 6:
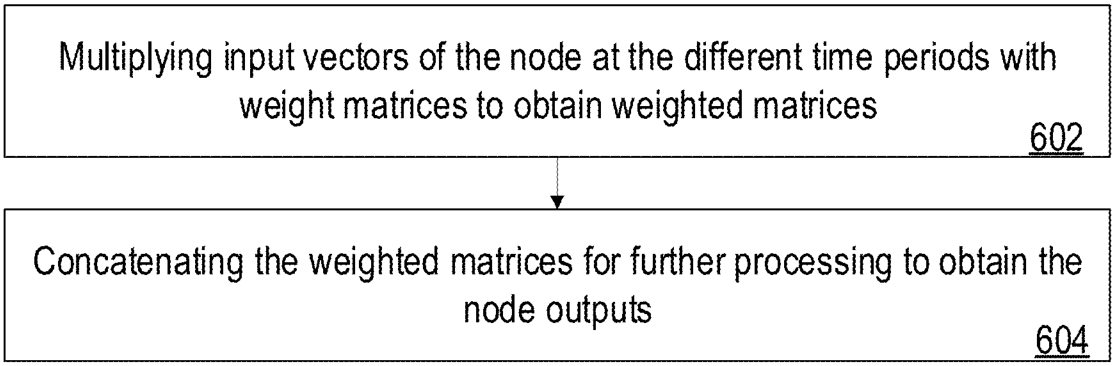
FIG. 6 is a flow diagram illustrating additional steps in the exemplary neural network quantization process according to some examples of the present disclosure.

In some examples, as shown in the above formula corresponding to calculations in an exemplary LSTMP, the input vectors of the node at each path are concatenated first before multiplying by the respective weight matrices. While in some other examples, as shown in FIG. 6, such sequence of calculation may be different for each node in the layer of neural network. For example, In Step 602, the input vectors for the node may be multiplies by a corresponding weight matrix first to receive weighted matrices, and then the weighted matrices are concatenated for further calculations and processing to obtain the node output, as illustrated in Step 604.

In accordance with one or more examples of the present disclosure, such recurrent neural network may be adopted for various application in related to audio and video processing and analysis, such as automatic speech recognition, video recognition, video motion detections etc. The recurrent neural network may be a Long Short-Term Memory (LSTM), a LSTM with recurrent project layer (LSTMP), a Gated Recurrent Unit (GRU), a Convolutional LSTM (ConvLSTM), etc.

In some examples of the present disclosure, after quantizing all neural network layers in the recurrent neural network, the recurrent neural network may be implemented in an edge computing device, or may be implemented in a Cloud computing device.

Feature learning-based AI algorithms have topped accuracy in almost every field over feature-engineering based algorithms. In general, feature learning-based AI algorithms are represented in different forms of neural networks. Comparing with feature-engineering based algorithms, computation costs of neural networks are greater in 2-4 magnitudes. How to reduce the computation cost or improve the computation efficiency on hardware is critical.

To reduce the computation cost, a common approach is quantization since fixed-point computation cost is 1-2 magnitudes less than floating-point computation. The major challenge in quantization is how to keep accuracy in fixed-point. The key point to minimize the quantization loss is to figure out the proper layer activation range in each node in the neural networks.

Quantization is one of the popular techniques to reduce the computation cost in inference. The major challenge is how to keep the accuracy in fixed-point. It is relatively easy to keep the fixed-point accuracy in CNN. However, it is harder to keep accuracy in RNN since the layer activation range of each node is messed up with the conventional profiling schemes.

Mathematically speaking, fixed point math, independent of processor speed, is easier to code with and faster than floating point math. From circuit design point of view, fixed-point circuit design is simpler and gate counts are less than floating-point circuit design. In consequences, with similar price, computation power in fixed-point is about 4~12× higher than floating-point. It is why quantization is an emerging technology and popular nowadays adopted in the Cloud and at the Edge.

Figure 5:
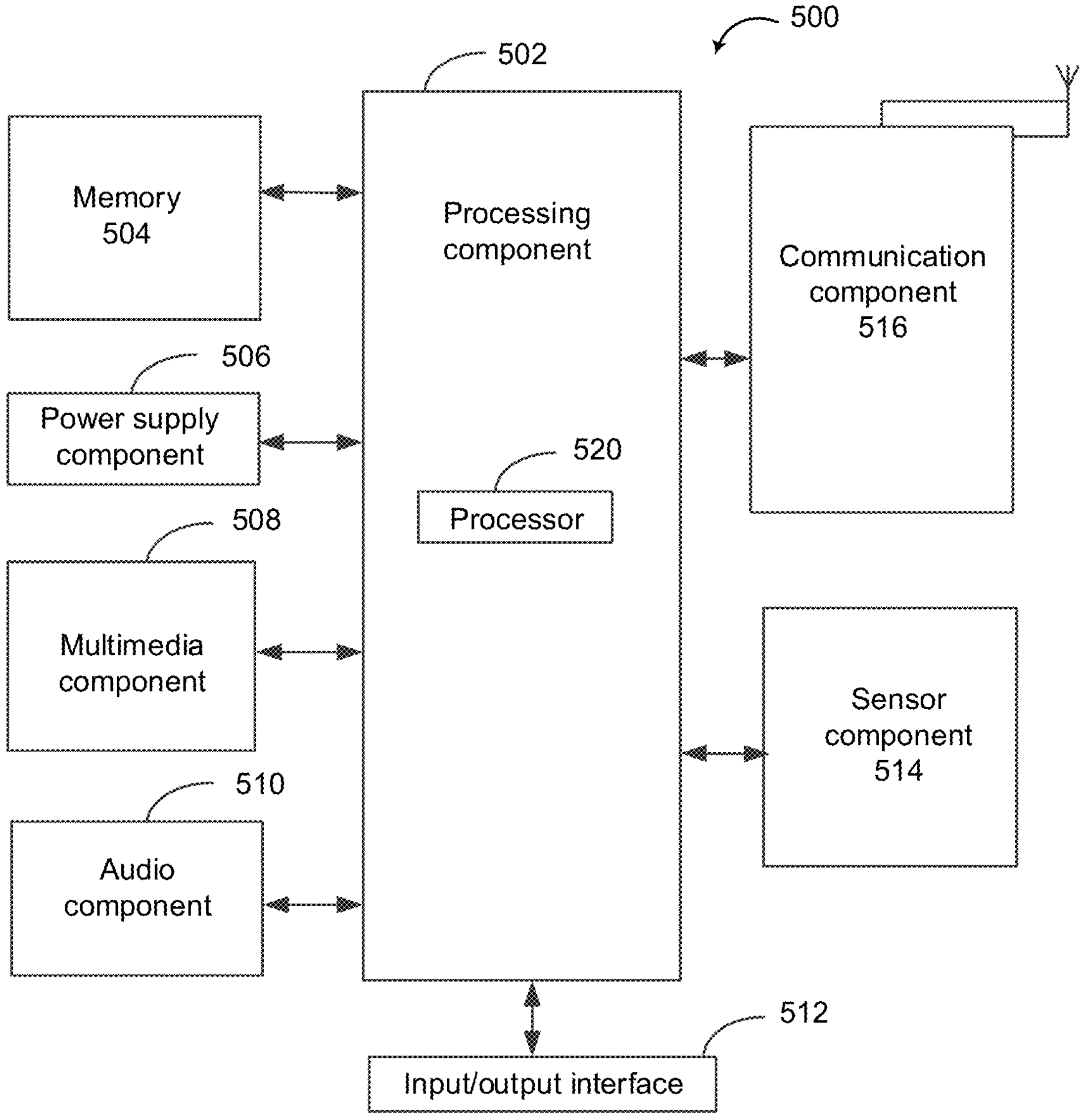
FIG. 5 is a block diagram illustrating an exemplary apparatus for neural network quantization in accordance with some implementations of the present disclosure.

FIG. 5 is a block diagram illustrating an exemplary apparatus for neural network quantization in accordance with some implementations of the present disclosure. The apparatus 500 may be an edge device, such as a terminal, a mobile phone, a tablet computer, a digital broadcast terminal, a tablet device, a personal digital assistant, or any computing device including one or more processors.

As shown in FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls overall operations of the apparatus 500, such as operations relating to display, a telephone call, data communication, a camera operation and a recording operation. The processing component 502 may include one or more processors 520 for executing instructions to complete all or a part of steps of the above method. Further, the processing component 502 may include one or more modules to facilitate interaction between the processing component 502 and other components. For example, the processing component 502 may include a multimedia module to facilitate the interaction between the multimedia component 508 and the processing component 502. The one or more processors 520 may include one or more of following processors: a central processing unit (CPU), a graphic processing unit (GPU), a General Matrix Multiplication (GEMM) processor, a point-wise processor, a digital signal processor (DSP), etc.

The memory 504 is configured to store different types of data to support operations of the apparatus 500. Examples of such data include instructions, contact data, phonebook data, messages, pictures, videos, and so on for any application or method that operates on the apparatus 500. The memory 504 may be implemented by any type of volatile or non-volatile storage devices or a combination thereof, and the memory 504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 supplies power for different components of the apparatus 500. The power supply component 506 may include a power supply management system, one or more power supplies, and other components associated with generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 508 may include a front camera and/or a rear camera. When the apparatus 500 is in an operation mode, such as a shooting mode or a video mode, the front camera and/or the rear camera may receive external multimedia data.

The audio component 510 is configured to output and/or input an audio signal. For example, the audio component 510 includes a microphone (MIC). When the apparatus 500 is in an operating mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module. The above peripheral interface module may be a keyboard, a click wheel, a button, or the like. These buttons may include but not limited to, a home button, a volume button, a start button and a lock button.

The sensor component 514 includes one or more sensors for providing a state assessment in different aspects for the apparatus 500. For example, the sensor component 514 may detect an on/off state of the apparatus 500 and relative locations of components. For example, the components are a display and a keypad of the apparatus 500. The sensor component 514 may also detect a position change of the apparatus 500 or a component of the apparatus 500, presence or absence of a contact of a user on the apparatus 500, an orientation or acceleration/deceleration of the apparatus 500, and a temperature change of apparatus 500. The sensor component 514 may include a proximity sensor configured to detect presence of a nearby object without any physical touch. The sensor component 514 may further include an optical sensor, such as a CMOS or CCD image sensor used in an imaging application. In some examples, the sensor component 514 may further include an acceleration sensor, a gyroscope sensor, a magnetic sensor, a pressure sensor, or a temperature sensor.

The communication component 516 is configured to facilitate wired or wireless communication between the apparatus 500 and other devices. The apparatus 500 may access a wireless network based on a communication standard, such as WiFi, 4G, or a combination thereof. In an example, the communication component 516 receives a broadcast signal or broadcast related information from an external broadcast management system via a broadcast channel. In an example, the communication component 516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc. The storage medium may be used to store or buffer data, network, and parameters.

As shown in the flowchart of FIG. 3, the exemplary neural network quantization process may be implemented in accordance with some examples of the present disclosure.

In step 302, the processor 520 obtains a neural network that comprises a node connected to different paths at different time periods. The neural network may include multiple layers, and each layer of the neural network may include multiple nodes. Each node in a layer may be connected with multiple paths at different time stamps in the neural network.

In step 304, the processor 520 obtains node outputs for the node at the different time periods. The processor 520 may obtain and record multiple node outputs for the same node at different time periods, such as outputs $y(t)$, $y(t-1)$, $y(t-2)$, $y(t-3)$, etc.

In step 306, the processor 520 determines statistic properties of the node outputs at the different time periods. The processor 520 may determine and record various statistic properties of the outputs at different time periods for each node. For example, the processor 520 may obtain and record one or a combination of following properties: the maximum value, the minimum value, the mean or median value, a variance, an entropy, a cross entropy, or a Kullback-Leiber Divergence of the node outputs, and the processor 520 may also obtain a histogram, or a probability density function for the node outputs.

In step 308, the processor 520 determines activation ranges of the node outputs based on the statistic properties. The processor 520 determines how the weighted sum of the input to the node would be transformed into the output from this node, and may also determine an output range for the layer of the neural network where the node is located.

In some examples, there is provided an apparatus for data processing. The apparatus includes one or more processors 520; and a memory 504 configured to store instructions executable by the one or more processors; where the one or more processors, upon execution of the instructions, are configured to perform a method as illustrated in FIG. 3.

In some other examples, there is provided a non-transitory computer readable storage medium 504, having instructions stored therein. When the instructions are executed by one or more processors 520, the instructions cause the processors to perform a method as illustrated in FIG. 3.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for neural network quantization, comprising:

obtaining a neural network configured for temporal profiling over a plurality of nodes, wherein the plurality of nodes comprises a first node connected to different paths across multiple time periods within a quantization process, each path representing a forward, backward, or bi-directional connection corresponding to a respective time period of a same node;

obtaining, via the temporal profiling that records and analyzes temporal variations of node outputs across the multiple time periods within the quantization process, node outputs for the first node across the multiple time periods, wherein the multiple time periods comprise at least a first time period and a second time period in temporal sequence, and wherein the node outputs comprise at least a first node output of the first node at the first time period and a second node output of the same first node at the second time period;

separately recording the first node output at the first time period and the second node output at the second time period during the quantization process;

separately analyzing, for the same first node, temporal variations between the first node output at the first time period and the second node output at the second time period by determining statistic properties corresponding to respective time periods, wherein the statistic properties comprise at least:

a first set of statistic properties of the first node output of the first node at the first time period, wherein the first set of statistic properties comprises a first maximum value and a first minimum value; and a second set of statistic properties of the second node output of the first node at the second time period, wherein the second set of statistic properties comprises a second maximum value and a second minimum value;

determining, using temporal profiling, a first activation range corresponding to the first time period based on the first set of statistic properties of the first node output at the first time period;

determining, using temporal profiling, a second activation range corresponding to the second time period based on the second set of statistic properties of the second node output at the second time period, wherein the second activation range differs from the first activation range;

determining additional activation ranges for remaining nodes of the plurality of nodes in the neural network based on temporal profiling; and quantizing, using temporal profiling, the neural network by:

quantizing the first node output at the first time period using the first activation range corresponding to the first time period;

quantizing the second node output at the second time period using the second activation range corresponding to the second time period; and respectively quantizing remaining node outputs based on corresponding activation ranges.

2. The method of claim 1, wherein the neural network is a recurrent neural network for automatic speech recognition; and wherein the method further comprises: implementing the recurrent neural network in an edge computing device after quantizing all neural network layers in the recurrent neural network.

3. The method of claim 1, wherein the neural network is one of following neural networks: a Long Short-Term Memory (LSTM), a LSTM with recurrent project layer (LSTMP), or a Gated Recurrent Unit (GRU).

4. The method of claim 1, wherein obtaining node outputs for the first node across the multiple time periods further comprises:

multiplying input vectors of the first node across the multiple time periods with weight matrices to obtain weighted matrices; and concatenating the weighted matrices for further processing to obtain the node outputs.

5. The method of claim 1, wherein the statistic properties comprise one or a combination of following properties: a mean estimate, a histogram, a probability density function, a variance estimate, an entropy, a cross entropy, or a Kullback-Leiber Divergence.

6. The method of claim 1, wherein the neural network is a recurrent neural network for video recognition.

7. An apparatus for implementing a neural network, comprising:

one or more processors; and a memory configured to store instructions executable by the one or more processors;

wherein the one or more processors, upon execution of the instructions, are configured to:

obtain a neural network configured for temporal profiling over a plurality of nodes, wherein the plurality of nodes comprises a first node connected to different paths across multiple time periods within a quantization process, each path representing a forward, backward, or bi-directional connection corresponding to a respective time period of a same node;

obtain, via temporal profiling that records and analyzes temporal variations of node outputs across the multiple time periods within the quantization process, node outputs for the first node across the multiple time periods, wherein the multiple time periods comprise at least a first time period and a second time period in a temporal sequence, and wherein the node outputs comprise at least a first node output of the first node at the first time period and a second node output of the same first node at the second time period;

separately record the first node output at the first time period and the second node output at the second time period during the quantization process;

separately analyze, for the same first node, temporal variations between the first node output at the first time period and the second node output at the second time period by determining statistic properties corresponding to respective time periods, wherein the statistic properties comprise at least:

a first set of statistic properties of the first node output of the first node at the first time period, wherein the first set of statistic properties comprises a first maximum value and a first minimum value; and a second set of statistic properties of the second node output of the second node at the second time period, wherein the second set of statistic properties comprises a second maximum value and a second minimum value;

determine, using temporal profiling, a first activation range corresponding to the first time period based on the first set of statistic properties of the first node output at the first time period;

determine, using temporal profiling, a second activation range corresponding to the second time period based on the second set of statistic properties of the second node output at the second time period, wherein the second activation range differs from the first activation range;

determine additional activation ranges for remaining nodes of the plurality of nodes in the neural network based on temporal profiling; and quantize, using temporal profiling, the neural network by:

quantize the first node output at the first time period using the first activation range corresponding to the first time period;

quantize the second node output at the second time period using the second activation range corresponding to the second time period; and respectively quantize remaining node outputs based on corresponding activation ranges.

8. The apparatus of claim 7, wherein the neural network is a recurrent neural network for automatic speech recognition; and wherein the one or more processors are further configured to:

implement the recurrent neural network in an edge computing device after quantizing all neural network layers in the recurrent neural network.

9. The apparatus of claim 7, wherein the neural network is one of following neural networks: a Long Short-Term Memory (LSTM), a LSTM with recurrent project layer (LSTMP), or a Gated Recurrent Unit (GRU).

10. The apparatus of claim 7, wherein the one or more processors are further configured to:

multiply input vectors of the first node across the multiple time periods with weight matrices to obtain weighted matrices; and concatenate the weighted matrices for further processing to obtain the node outputs.

11. The apparatus of claim 7, wherein the statistic properties comprise one or a combination of following properties: a mean estimate, a histogram, a probability density function, a variance estimate, an entropy, a cross entropy or a Kullback-Leiber Divergence.

12. The apparatus of claim 7, wherein the neural network is a recurrent neural network for video recognition.

13. A non-transitory computer readable storage medium, comprising instructions stored therein to implement a neural network, wherein, upon execution of the instructions by one or more processors, the instructions cause the one or more processors to perform acts comprising:

obtaining a neural network configured for temporal profiling over a plurality of nodes, wherein the plurality of nodes comprises a first node connected to different paths across multiple time periods within a quantization process, each path representing a forward, backward, or bi-directional connection corresponding to a respective time period of a same node;

obtaining, via temporal profiling, node outputs for the node across the multiple time periods within the quantization process, wherein the multiple time periods comprise at least a first time period and a second time period in a temporal sequence, and wherein the node outputs comprise at least a first node output of the first node at the first time period and a second node output of the same first node at the second time period;

separately recording the first node output at the first time period and the second node output at the second time period during the quantization process;

separately analyzing, for the same first node, temporal variations between the first node output at the first time period and the second node output at the second time period by determining statistic properties corresponding to respective time periods, wherein the statistic properties comprise at least:

a first set of statistic properties of the first node output of the first node at the first time period, wherein the first set of statistic properties comprises a first maximum value and a first minimum value; and a second set of statistic properties of the second node output of the second node at the second time period, wherein the second set of statistic properties comprises a second maximum value and a second minimum value;

determining, using temporal profiling, a first activation range corresponding to the first time period based on the first set of statistic properties of the first node output at the first time period;

determining, using temporal profiling, a second activation range corresponding to the second time period based on the second set of statistic properties of the second node output at the second time period, wherein the second activation range differs from the first activation range;

determining additional activation ranges for remaining nodes of the plurality of nodes in the neural network based on temporal profiling; and quantizing, using temporal profiling, the neural network by:

quantizing the first node output at the first time period using the first activation range corresponding to the first time period;

quantizing the second node output at the second time period using the second activation range corresponding to the second time period; and respectively quantizing remaining node outputs based on corresponding activation ranges.

14. The non-transitory computer readable storage medium of claim 13, wherein the neural network is a recurrent neural network for automatic speech recognition; and wherein the instructions cause the one or more processors to further perform:

implementing the recurrent neural network in an edge computing device after quantizing all neural network layers in the recurrent neural network.

15. The non-transitory computer readable storage medium of claim 13, wherein the neural network is one of following neural networks: a Long Short-Term Memory (LSTM), a LSTM with recurrent project layer (LSTMP), or a Gated Recurrent Unit (GRU).

16. The non-transitory computer readable storage medium of claim 13, wherein obtaining node outputs for the first node across the multiple time periods further comprises:

multiplying input vectors of the first node across the multiple time periods with weight matrices to obtain weighted matrices; and concatenating the weighted matrices for further processing to obtain the node outputs.

17. The non-transitory computer readable storage medium of claim 13, wherein the statistic properties comprise one or a combination of following properties: a mean estimate, a histogram, a probability density function, a variance estimate, an entropy, a cross entropy or a Kullback-Leiber Divergence.

18. The method of claim 1, wherein the neural network is a recurrent neural network and temporal profiling comprises obtaining outputs of a same node during multiple sequential time periods of the quantization process and analyzing the outputs to determine changes in statistical properties and activation ranges over time for use in quantizing the recurrent neural network.

19. The apparatus of claim 7, wherein the neural network is a recurrent neural network and temporal profiling comprises obtaining outputs of a same node during multiple sequential time periods of the quantization process and analyzing the outputs to determine changes in statistical properties and activation ranges over time for use in quantizing the recurrent neural network.

20. The non-transitory computer readable storage medium of claim 13, wherein the neural network is a recurrent neural network and temporal profiling comprises obtaining outputs of a same node during multiple sequential time periods of the quantization process and analyzing the outputs to determine changes in statistical properties and activation ranges over time for use in quantizing the recurrent neural network.

* * * * *